United States Patent
Ostrager

[15] 3,686,985
[45] Aug. 29, 1972

[54] SELF-EJECTING CHUCK KEY
[72] Inventor: Seymour A. Ostrager, 1188 Grand Course, Bronx, N.Y. 10451
[22] Filed: Nov. 9, 1970
[21] Appl. No.: 87,672

[52] U.S. Cl. ..............................81/90 A, 279/1 K
[51] Int. Cl. ............................................B25b 13/44
[58] Field of Search ............81/90 A, 90 R; 279/1 K; 70/414

[56] References Cited
UNITED STATES PATENTS 2,609,719  9/1952  Lilley........................81/90 A
2,598,119  5/1952  Goff...........................81/90 A Primary Examiner—Robert C. Riordon
Assistant Examiner—Roscoe V. Parker, Jr.
Attorney—Caesar, Rivise, Bernstein & Cohen

[57] ABSTRACT

A chuck key is provided which has a handle member at one end and a pilot at the other end of the key. A pinion is provided around and adjacent the pilot. The pinion has a cylindrical recess which is coaxial with the axis of the pilot and provides a space between the pilot and the pinion. An ejector member is also provided which comprises a cylindrical collar. The collar extends in the cylindrical recess and slidably embraces the pilot. The collar is spring-biased to extend to a position beyond the forwardmost surface of the pinion. The collar is movable into the recess when pressure is applied to the key for use thereof in a chuck. The collar acts to eject the key from the chuck when the pressure is released.

7 Claims, 6 Drawing Figures

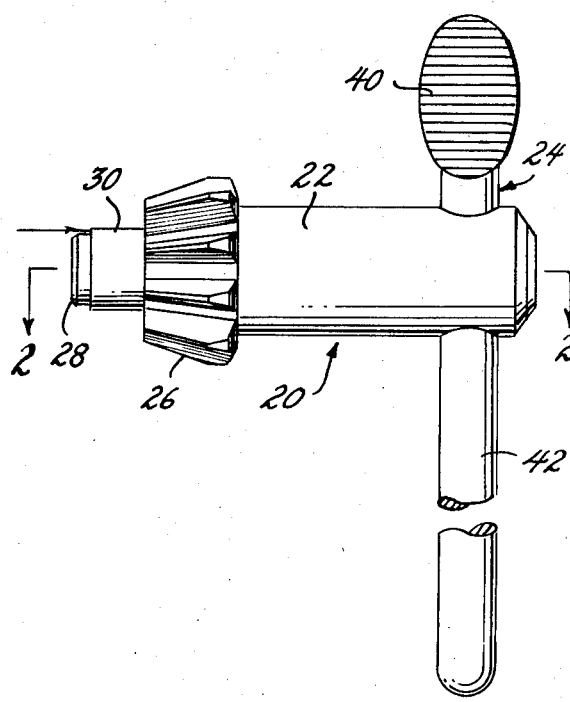
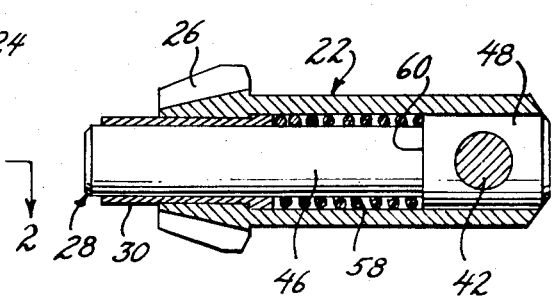
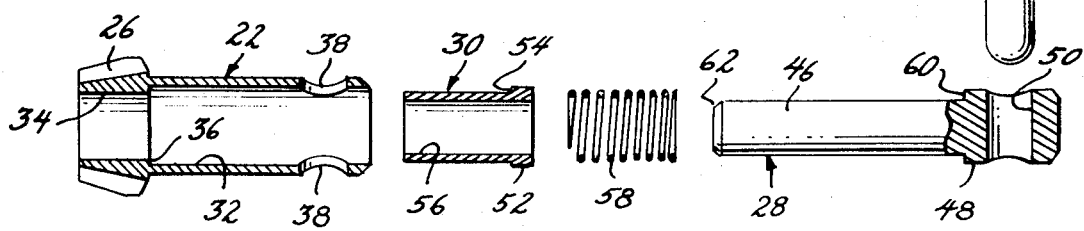

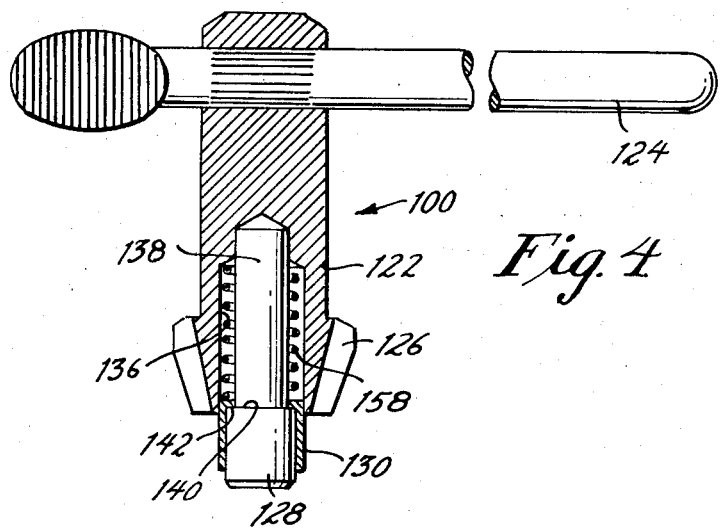
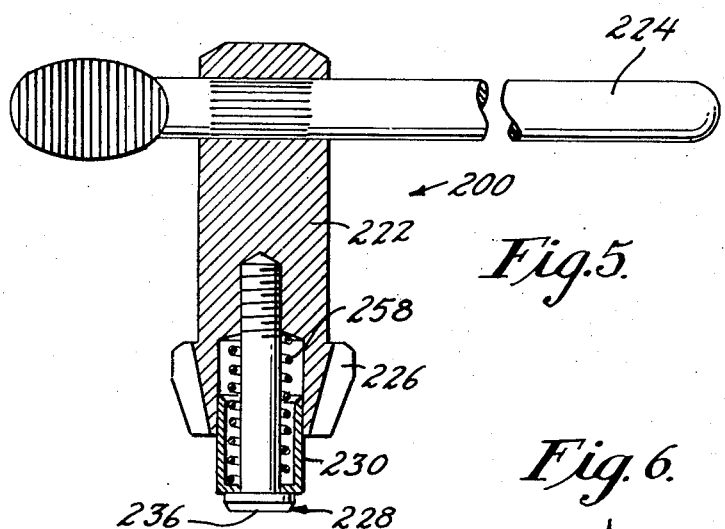
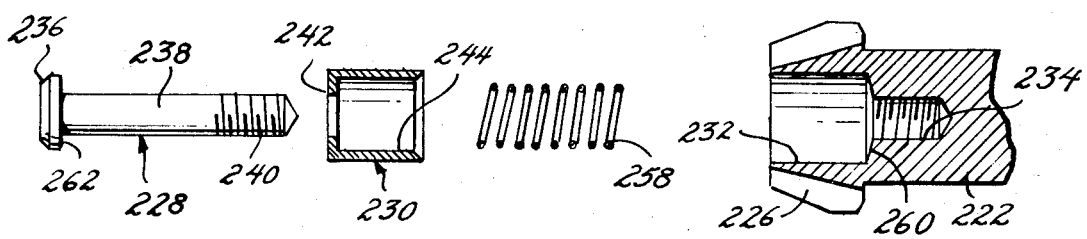

SELF-EJECTING CHUCK KEY

This invention relates generally to chuck keys and more particularly to a self-ejecting chuck key which will automatically be kicked out of a chuck when pressure is released by the user thereof after tightening or loosening the grip of a chuck.

When chuck keys of ordinary construction are manually placed in the socket of a chuck to rotate the same for the purpose of tightening or loosening the same and the key is inadvertently left in the chuck, the key is thrown by centrifugal force when the chuck is rotated and often accidents are caused by the flying key.

A safety chuck key with ejector means is shown in the Dossie U.S. Pat. No. 2,660,081. The Dossie key has proven to be a valuable safety device for use with chucks. The Dossie key while being an extremely important safety device has, however, proven to be fairly expensive to manufacture. That is, the plunger provided in the pin or pilot of the Dossie chuck key is provided in an opening which is drilled off-center of the pin but which extends parallel to the axis of the pin. Off-center drilling, however, is not only time consuming, but it is also expensive.

It is, therefore, an object of this invention to overcome the aforementioned disadvantages of the Dossie patent.

Yet another object of the invention is to provide a new and improved self-ejecting chuck key which is inexpensive to manufacture yet which maintains all of the advantages of the Dossie self-ejecting chuck key.

Yet another object of the invention is to provide a new and improved self-ejecting chuck key which includes a plunger comprised of a cylindrical collar provided about the pilot of the key.

These and other objects of the invention are achieved by providing a chuck key having a handle member at one end and a pilot at the other end. A pinion is provided which is surrounding and adjacent the pilot. The pinion has a cylindrical recess which is coaxial with the axis of the pilot and provides a space between the pilot and the pinion. An ejector member is provided which comprises a cylindrical collar which extends in the cylindrical recess and slidably embraces the pilot. The collar is spring-biased to extend to a position beyond the forwardmost surface of the pinion. The collar is movable into the recess when pressure is applied to the key for use thereof in a chuck. The collar acts to eject the key from the chuck when the pressure is released.

Other objects and many of the attendant advantages of this invention will be readily appreciated as the same becomes better understood by reference to the following detailed description when considered in connection with the accompanying drawings wherein:

FIG. 1 is a side elevational view of a chuck key embodying the invention;

FIG. 2 is a sectional view taken along the line 2—2 in FIG. 1 with the pilot shown in full for purposes of clarity;

FIG. 3 is an exploded vertical sectional view with portions shown in full for purposes of clarity to show the construction of the ejector key;

FIG. 4 is a vertical sectional view of an alternate embodiment of the invention with the pilot shown in full for purposes of clarity;

FIG. 5 is a vertical sectional view of a second alternate embodiment of the invention; and FIG. 6 is an exploded vertical sectional view of the second alternate embodiment of the invention with portions shown in full for purposes of clarity.

Referring now in greater detail to the various figures of the drawings wherein like reference numerals refer to like parts, a preferred self-ejecting chuck key embodying the invention is shown generally at 20.

Key 20 basically comprises a cylindrical body 22, an elongated handle 24, a pinion 26, a pilot 28 and a collar 30. As best seen in FIG. 3, the body 22 is generally cylindrical and includes a cylindrical longitudinally extending bore 32 which extends entirely through the body 22. The pinion 26 is integral with the body 22 and is provided at one end thereof.

The bore 32 is reduced within the pinion 26 at 34. The section 34 of bore 32 which is reduced causes a shoulder to be formed at 36, the purpose of which will hereinafter be discussed.

Provided at the other end of the body 22 is a pair of diametrically opposed radially extending, aligned openings 38. The openings 38 accommodate the handle 24 which is telescoped therethrough when the key 20 is assembled.

Handle 24 basically comprises an enlarged flattened portion 40 and a shaft 42. The shaft 42 extends through the openings 38 in the body as well as through an opening which is provided in the pilot 28 at the rear end thereof. The shaft 42 of the handle 24 includes a knurled portion 44 which enables the key to be press-fit within the body for a more secure engagement therein.

The pilot 28 is comprised of an elongated cylindrical pin 46 which is integral with an enlarged portion 48 at the rear end thereof. The enlarged portion 48 includes a transversely extending bore 50 which is adapted to receive the shaft 42 of the handle 24.

Collar 30 is generally cylindrical and includes an enlarged rear portion 52 which forms a shoulder 54 between the main body of the collar 30 and the enlarged portion 52. The shoulder 54, as will hereinafter be seen, is used to abut shoulder 36 within bore 32 of the body 22 to limit the extent of longitudinal movement therein. The collar 30 also includes an elongated cylindrical bore 56. The bore 56 is slightly larger in diameter than the outer diameter of the pin 46 of pilot 28. A coil spring 58 is also provided which also includes a longitudinally extending bore which is slightly larger than the outer diameter of pin 46 of pilot 28.

As best seen in FIG. 3, the key 20 is assembled by inserting the collar 30 within the bore 32 of body 22 so that the collar 30 projects out of the section 34 of the bore 32 beyond the forwardmost surface of pinion 26. The collar 30 is inserted until such time as the shoulder 54 thereof abuts the shoulder 36 of bore 32.

The spring 58 is then placed over the pin 46 of pilot 28 and pilot 28 is then inserted so that pin 46 extends through the bore 56 of the collar 30 and extends through the end of the collar so that it is in the position shown in FIG. 2.

It should be noted that the enlarged portion 48 of the pilot 28 forms a shoulder 60 at the rear of pin 46. Shoulder 60 of the pilot 28 abuts one end of coil spring 58 so that the spring 58 urges or biases the collar 30 outwardly of the recess formed between the pinion 26 and pin 46. The forwardmost edge of the collar, thus, projects to a position adjacent the tip of the pilot but intermediate thereof.

When the bore 50 of the enlarged portion 48 of pilot 28 is aligned with the openings 38 in the housing 22, the shaft 42 of the handle 24 is inserted therethrough and, thus, completes assembly of the key 20 when the knurled portion 44 is press-fit into bore 50 of the enlarged portion.

In operation, the forwardmost end of pilot 28, which is chamfered to facilitate ease of guiding into an opening, is inserted into the opening of the chuck. As the end 62 is inserted into the opening, the surface surrounding the opening of the chuck causes the collar 30 to be retracted, thereby causing an increased force against the surface surrounding the opening in the chuck. Thus, as soon as manual pressure is released from the handle for the purposes of tightening or loosening the chuck, the collar 30 acts as a plunger to eject the pilot 28 out of the opening in the chuck. The key, thus, falls out of the chuck and prevents any possibility of rotating with the chuck thereafter.

It should be noted that each of the parts of the housing and the plunger mechanism have coaxial surfaces and bores. That is, the outer surface of the housing 22 and the bore thereof are coaxial. Similarly, the collar 30 and the pilot 28 have coaxial outer and inner surfaces. Accordingly, off-center drilling is not required for providing the plunger mechanism in the key 20.

The smaller diameter of the outer surface of pin 46 of pilot 28 with respect to bore 32 of housing 22 provides a cylindrical recess within the pinion 26 to accommodate the collar 30. The collar 30 is retractable within the recess to a point flush with the outermost surface of pinion 26.

It should also be noted that due to the simplified construction, the pilot 28 is fixed in relationship to the housing 22 of key 20. Thus, when pilot 28 is inserted into the opening of the chuck, there is no give of the pilot with respect to the handle when inserting the pilot into the opening in the chuck. This means that there is a solid engagement in the opening of the chuck between the key and the chuck gear. Moreover, the provision of a collar completely surrounding the pilot 28 aids in uniformity of force to eject the key thereby preventing a slightly misaligned or poorly formed opening in the chuck from retaining the key therein.

An alternate embodiment of my invention is shown at 100 in FIG. 4. Basically, key 100 comprises a housing 122, a handle 124, a pinion 126, a pilot 128 and a collar 130.

Housing 122 is generally cylindrical and solid and includes a transversely extending opening at the rear thereof for the accommodation of handle 124. The pinion 126 is integral with and provided at one end of housing 122 and includes a cylindrical recess 136 which is adapted to accommodate the pilot 128.

The pilot 128 is generally cylindrical and includes a reduced portion 138 which is press-fit into a reduced portion of bore 136. The reduced portion 138 of the pilot forms a rearwardly facing annular shoulder 140 which acts to maintain collar 130 between the cylindrical recess 136.

The collar 130 is cylindrical and includes an annular inwardly extending end flange 142 which abuts the shoulder 140 of pilot 128 in the forwardmost position of the collar.

A coil spring 158 is also mounted over the reduced portion 138 of pilot 128 before the reduced portion 138 is press-fit into the reduced portion of bore or recess 136. The spring 158 acts to urge the collar 130 outwardly of the recess 136. Accordingly, the annular flange 142 abuts the shoulder 140 unless the pilot 128 is inserted in the opening of a chuck. The insertion of the pilot 128 into an opening in the chuck causes the retraction of the collar 130 into the recess formed by the bore 136 between the pinion and the pilot. Thus, the collar 130 acts as a plunger to eject the key 100 from the chuck after pressure is released.

A second alternate embodiment of the invention is shown at 200 in FIG. 5. Key 200 basically comprises a generally cylindrical body 222, a handle 224, a pinion 226, a pilot 228 and a collar 230. As best seen in FIG. 6, the pinion 226 is integral with the body 222 and includes a longitudinally extending bore 232. The bore 232 is cylindrical and coaxial with the outer surface of body 222 and forms a recess which has a reduced section 234. The reduced section of the bore 232 is threaded and is adapted to receive a threaded shaft.

At the other end of the body 222 is an elongated transversely extending opening which is adapted to receive the shaft of handle 224. The handle 224 is secured in the body 222 by a press-fit.

The pilot 228 includes an enlarged end 236 and an elongated cylindrical portion 238. The elongated cylindrical portion 238 includes a threaded portion 240 which is adapted to be threadedly secured in bore 234. The collar 230 includes an annular flange 242 at the forwardmost end of the collar which acts as a shoulder at the end of cord 244 which is provided in collar 230. A coil spring 258 is provided and, as seen in FIG. 5, is assembled between collar 230 and the shoulder formed by the flange 242 and shoulder 260 formed between the reduced portion 234 of bore 232 and the enlarged portion of the bore.

Thus, the elongated cylindrical portion 238 of pilot 228 is inserted through the bore of collar 230, spring 258 is also telescoped over the pin 238 and the pilot 228 is then screwed into the threaded portion 234 of bore 232. The coil spring 258 causes the collar 230 to be urged against the shoulder 262 formed between the enlarged portion 236 of the pilot and the elongated portion 238. When portion 236 of the pilot is inserted into an opening of a chuck, the collar 238 is retracted and coil spring 258 thereby causes the collar to be spring-biased against the surface surrounding the opening so that when pressure is released from the key, the key is self-ejected.

It can, therefore, be seen that a new and improved self-ejecting chuck key has been provided. In each of the embodiments of the invention, a recess is formed between the pinion and the pilot which provides a space in which a collar can be provided. The cylindrical collar acts as a plunger and provides a uniform ejecting force completely around the pin of the pilot. This means that the key will be smoothly ejected from the opening in the chuck.

Moreover, because in each of the embodiments, the surfaces of the bores and the outer surfaces of the parts are coaxial, the operations performed in manufacturing the new components of the key are simplified and made less expensive. Accordingly, a new and improved chuck key has been provided which simplifies and makes less expensive construction thereof.

Without further elaboration, the foregoing will so fully illustrate my invention that others may, by applying current or future knowledge, readily adapt the same for use under various conditions of service.

What is claimed as the invention is:

1. A chuck key having a handle member at one end and a pilot at the other end of said key, a cylindrical body member having a pinion surrounding and adjacent said pilot, said body member including a longitudinally extending bore which extends the length of said body member and forms a cylindrical recess in said pinion which is coaxial with the axis of said pilot and provides a space between said pilot and said pinion, an ejector member comprising a cylindrical collar, said collar extending in said cylindrical recess and slidably embracing said pilot, said collar being spring-biased to extend to a position beyond the forwardmost surface of said pinion, said cylindrical bore having a reduced portion at the forwardmost end of said body surrounding said pilot which forms a shoulder to limit the outer extent of movement of said collar, said collar being movable into said recess when pressure is applied to said key for use thereof in a chuck, said collar acting to eject the key from said chuck when said pressure is released, said pilot extending into said bore to said one end of said body and said body member and said pilot including a transversely extending opening, said handle being secured in said openings to enable securement of said body, handle and pilot.

2. A chuck key having a handle member at one end and a pilot at the other end of said key, a pinion surrounding and adjacent said pilot, said pinion having a cylindrical recess which is coaxial with the axis of said pilot and provides a space between said pilot and said pinion, said recess being terminated within the body of said key and including a reduced portion at the inner end thereof, said pilot being affixed in said reduced portion of said recess to said body, an ejector member comprising a cylindrical collar, said collar extending in said cylindrical recess and slidably embracing said pilot, said collar being spring-biased to extend to a position beyond the forwardmost surface of said pinion, said pilot including an enlarged end which forms a shoulder facing to the rear of said key, said collar having a shoulder facing the forward end of said key, said shoulder of said collar and said shoulder of said pilot abutting each other to limit the extent of outward movement of said collar from said recess, said collar being movable into said recess when pressure is applied to said key for use thereof in a chuck, said collar acting to eject the key from said chuck when said pressure is released.

3. The chuck key of claim 2 wherein said pilot is affixed to said body by a press-fit.

4. The chuck key of claim 2 wherein said pilot is threadedly secured to said body.

5. The chuck key of claim 1 wherein a spring is provided which slidably embraces said pilot and urges said collar outwardly of said body of said key.

6. The chuck key of claim 7 wherein said collar includes an enlarged portion, said spring and said collar being telescoped over said pilot with said spring abutting said enlarged portion of said collar to provide spring-bias to said collar.

7. The chuck key of claim 5 wherein said portion of said pilot including a transversely extending opening is enlarged, said enlarged portion forming a shoulder for abutting the rearmost end of said spring.

* * * * *